(12) United States Patent
Suzuki

(10) Patent No.: US 8,736,972 B2
(45) Date of Patent: May 27, 2014

(54) ZOOM LENS, OPTICAL APPARATUS AND METHOD FOR MANUFACTURING ZOOM LENS

(75) Inventor: Atsushi Suzuki, Tokyo (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 13/369,146

(22) Filed: Feb. 8, 2012

(65) Prior Publication Data

US 2012/0200746 A1 Aug. 9, 2012

(30) Foreign Application Priority Data

Feb. 8, 2011 (JP) ................................ 2011-025335

(51) Int. Cl.
*G02B 15/14* (2006.01)

(52) U.S. Cl.
USPC ............................ 359/689; 359/681; 359/682

(58) Field of Classification Search
USPC .................. 359/681, 682, 689, 680, 833, 889
See application file for complete search history.

(56) References Cited

U.S. PATENT DOCUMENTS

| | | | |
|---|---|---|---|
| 7,227,682 B2 | 6/2007 | Caldwell et al. | |
| 7,339,744 B2 | 3/2008 | Hankawa et al. | |
| 2004/0246362 A1* | 12/2004 | Konno | 348/335 |
| 2005/0259329 A1* | 11/2005 | Yagyu et al. | 359/676 |
| 2006/0221212 A1 | 10/2006 | Hankawa et al. | |
| 2006/0227415 A1 | 10/2006 | Caldwell et al. | |

FOREIGN PATENT DOCUMENTS

| | | |
|---|---|---|
| JP | 2005-084151 A | 3/2005 |
| JP | 2006-171492 A | 6/2006 |
| JP | 2006-284790 A | 10/2006 |
| JP | 2007-093985 A | 4/2007 |
| JP | 2008-536175 A | 9/2008 |
| JP | 2012-145624 A | 8/2012 |
| WO | WO 2006/110283 A2 | 10/2006 |

* cited by examiner

*Primary Examiner* — Scott J Sugarman
*Assistant Examiner* — Mustak Choudhury
(74) *Attorney, Agent, or Firm* — Miles & Stockbridge P.C.

(57) ABSTRACT

With comprising, in order from an object side: a first lens group G1 having negative refractive power; a second lens group G2; and a third lens group G3, the first lens group G1 includes, in order from the object side, a front group having negative refractive power, and a reflection optical element P that folds an optical path, a position of the first lens group G1 being fixed along the optical axis upon zooming from a wide-angle end state W to a telephoto end state T, and satisfying a given conditional expression, thereby providing a downsized zoom lens having a reflection optical element and a wide angle of view with thinning its profile by means of shortening a distance along an optical axis between the most object side lens surface and an object side optical surface of the reflection optical element.

15 Claims, 11 Drawing Sheets

ZOOM LENS, OPTICAL APPARATUS AND METHOD FOR MANUFACTURING ZOOM LENS

The disclosure of the following priority applications is herein incorporated by reference:

Japanese Patent Application No. 2011-025335 filed on Feb. 8, 2011.

BACKGROUND OF THE INVENTION

1. Field of the Invention

The present invention relates to a zoom lens, an optical apparatus, and a method for manufacturing the zoom lens.

2. Related Background Art

There have been proposed zoom lenses, installed in a video camera or a digital still camera, having a wide angle of view and a lens configuration in which an optical path is folded by disposing a reflection optical element in the zoom lens (for example, see Japanese Patent Application Laid-Open Nos. 2006-171492 and 2007-093985).

However, in the above-described conventional zoom lens, an object side lens length from the reflection optical element, in other words, a distance along an optical axis between the most object side lens surface and an object side optical surface of the reflection optical element is large. Accordingly, a thickness of the zoom lens of the most object side lens along the optical axis is large, so that the zoom lens cannot be sufficiently thin.

Moreover, the above-described conventional zoom lens has a defect that a lens disposed to the object side of the reflection optical element becomes large upon widening the zoom lens. Accordingly, it has been difficult to widen the zoom lens with realizing a downsized zoom lens.

SUMMARY OF THE INVENTION

The present invention is made in view of the above-described problem, and has an object to provide a downsized zoom lens having a reflection optical element and a wide angle of view with thinning its profile by means of shortening an object side lens length from the reflection optical element, in other words, a distance along an optical axis between the most object side lens surface and an object side optical surface of the reflection optical element, an optical apparatus, and a method for manufacturing the zoom lens.

According to a first aspect of the present invention, there is provided a zoom lens comprising, in order from an object side along an optical axis: a first lens group having negative refractive power; a second lens group; and a third lens group, the first lens group includes, in order from the object side along the optical axis, a front group having negative refractive power, and a reflection optical element that folds an optical path, a position of the first lens group being fixed along the optical axis upon zooming from a wide-angle end state to a telephoto end state, and the following conditional expression (1) being satisfied:

$$(-f1p)/Dp < 0.89 \quad (1)$$

where f1p denotes a focal length of the front group, and Dp denotes a length of the reflection optical element along the optical axis.

According to a second aspect of the present invention, there is provided an optical apparatus equipped with the zoom lens according to the first aspect.

According to a third aspect of the present invention, there is provided a method for manufacturing a zoom lens comprising steps of: disposing, in order from an object side along an optical axis, a first lens group having negative refractive power, a second lens group, and a third lens group; disposing, in order from the object side along the optical axis, a front group having negative refractive power, a reflection optical element that folds an optical path into the first lens group; constructing the zoom lens such that a position of the first lens group on the optical axis may be fixed upon zooming from a wide-angle end state to a telephoto end state; and disposing the first lens group with satisfying the following conditional expression (1):

$$(-f1p)/Dp < 0.89 \quad (1)$$

where f1p denotes a focal length of the front group, and Dp denotes a length of the reflection optical element along the optical axis.

The present invention makes it possible to provide a zoom lens having a reflection optical element and a wide angle of view with thinning its profile by means of shortening the object side lens length from the reflection optical element, in other words, a distance along an optical axis between the most object side lens surface and an object side optical surface of the reflection optical element, an optical apparatus, and a method for manufacturing the zoom lens.

BRIEF DESCRIPTION OF THE DRAWINGS

FIGS. 2A, 2B and 2C are graphs showing various aberrations of the zoom lens according to Example 1 of the present application upon focusing on an infinitely distant object, in which FIG. 2A shows various aberrations in a wide-angle end state, FIG. 2B shows various aberrations in an intermediate focal length state, and FIG. 2C shows various aberrations in a telephoto end state.

FIGS. 4A, 4B and 4C are graphs showing various aberrations of the zoom lens according to Example 2 of the present application upon focusing on an infinitely distant object, in which FIG. 4A shows various aberrations in a wide-angle end state, FIG. 4B shows various aberrations in an intermediate focal length state, and FIG. 4C shows various aberrations in a telephoto end state.

FIGS. 6A, 6B and 6C are graphs showing various aberrations of the zoom lens according to Example 3 of the present application upon focusing on an infinitely distant object, in which FIG. 6A shows various aberrations in a wide-angle end state, FIG. 6B shows various aberrations in an intermediate focal length state, and FIG. 6C shows various aberrations in a telephoto end state.

FIGS. 8A, 8B and 8C are graphs showing various aberrations of the zoom lens according to Example 4 of the present application upon focusing on an infinitely distant object, in which FIG. 8A shows various aberrations in a wide-angle end state, FIG. 8B shows various aberrations in an intermediate focal length state, and FIG. 8C shows various aberrations in a telephoto end state.

FIGS. 9A and 9B are graphs showing a camera equipped with a zoom lens according to the present application, in which FIG. 9A is a front view, and FIG. 9B is a rear view.

DESCRIPTION OF THE MOST PREFERRED EMBODIMENT

Figure 1:
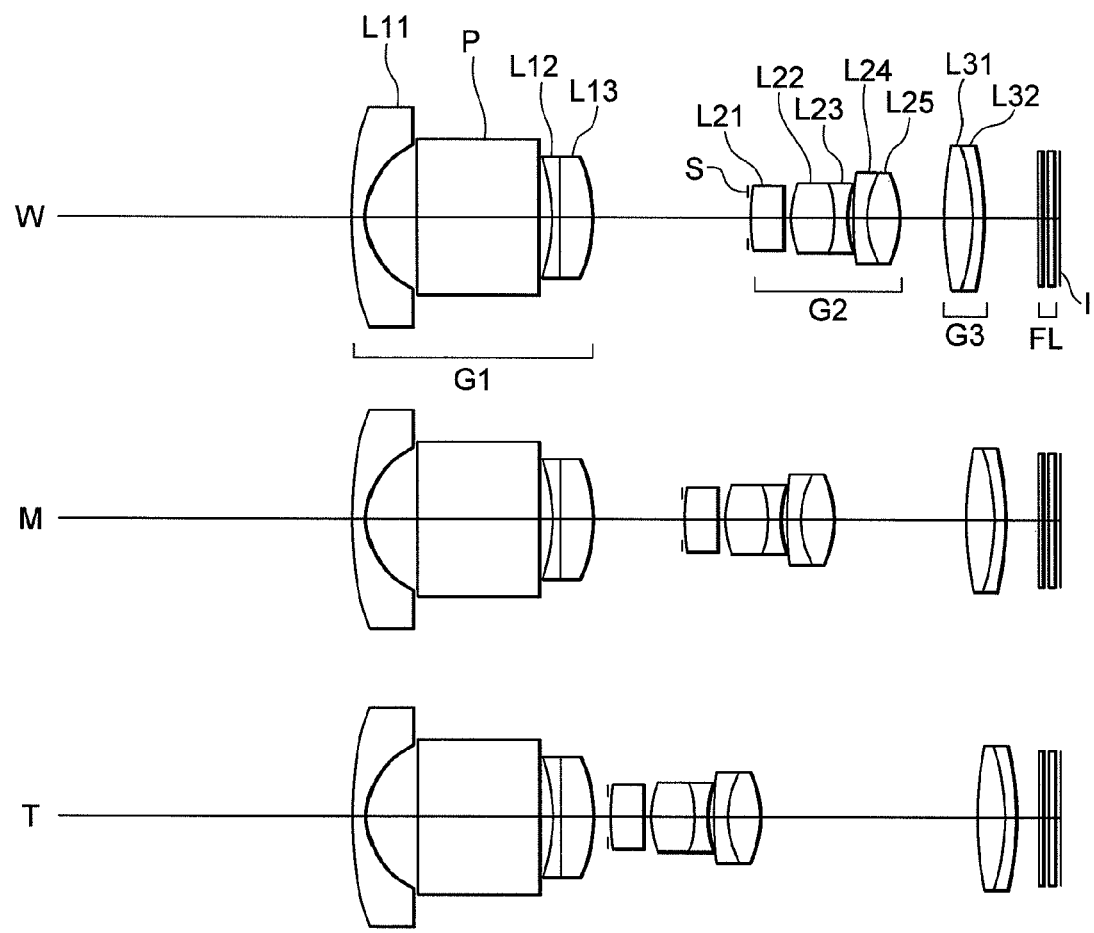
FIG. 1 shows a lens configuration of a zoom lens according to Example 1 of the present application.

A zoom lens, an optical apparatus, and a method for manufacturing the zoom lens according to the present application are explained below.

A zoom lens according to the present application includes, in order from an object side along an optical axis, a first lens group having negative refractive power, a second lens group and a third lens group. The first lens group includes, in order from an object side along an optical axis, a front group having negative refractive power, and a reflection optical element for folding an optical path. A position of the first lens group along the optical axis is fixed upon zooming from a wide-angle end state to a telephoto end state. The following conditional expression (1) is satisfied:

$$(-f1p)/Dp < 0.89 \tag{1}$$

where f1p denotes a focal length of the front group, and Dp denotes a length of the reflection optical element along the optical axis.

In a zoom lens according to the present application, with disposing the reflection optical element to the object side in the zoom lens, in other words, in the first lens group, it becomes possible to make the zoom lens thin. Moreover, in a zoom lens according to the present application, the first lens group in which the reflection optical element is disposed has negative refractive power, so that the height of the ray incident on the reflection optical element becomes small. Accordingly, the reflection optical element can be thin.

The above-described conditional expression (1) defines a ratio of the focal length of the front group to the optical path length of the reflection optical element. With satisfying conditional expression (1), a zoom lens according to the present application makes it possible to excellently correct curvature of field and to accomplish downsizing of the zoom lens.

When the value of conditional expression (1) is equal to or exceeds the upper limit of conditional expression (1), refractive power of the front group becomes excessively small. Accordingly, generation of curvature of field becomes too large to be corrected. Moreover, a height of a ray incident on the reflection optical element becomes large, so that the reflection optical element becomes large. Accordingly, a zoom lens according to the present application cannot be downsized. In order to secure the effect of the present application, it is preferable to set the upper limit of conditional expression (1) to 0.85.

With this configuration, a downsized zoom lens having a reflection optical element and a wide angle of view with thinning its profile by means of shortening the object side lens length from the reflection optical element, in other words, a distance along an optical axis between the most object side lens surface and an object side optical surface of the reflection optical element can be realized.

In a zoom lens according to the present application, the following conditional expression (2) is preferably satisfied:

$$0.70 < D1p/fw < 2.00 \tag{2}$$

where D1p denotes a distance along the optical axis between the object side lens surface of the most object side lens and the object side surface of the reflection optical element, and fw denotes a focal length of the zoom lens in the wide-angle end state.

Conditional expression (2) defines the distance along the optical axis between the object side lens surface of the most object side lens and the object side surface of the reflection optical element. With satisfying conditional expression (2), a zoom lens according to the present application makes it possible to excellently correct coma and to accomplish thinning and downsizing of the zoom lens.

When the value of conditional expression (2) is equal to or exceeds the upper limit of conditional expression (2), the object side lens length from the reflection optical element, in other words, a distance along an optical axis between the most object side lens surface and an object side optical surface of the reflection optical element becomes large, so that it becomes impossible to accomplish thinning the zoom lens. Moreover, as the optical path of the reflection optical element becomes large, the lens diameter of the lens(es) disposed to the object side of the reflection optical element becomes large, so that it becomes impossible to accomplish downsizing. Furthermore, variation in lateral chromatic aberration upon zooming becomes large, so that it is undesirable.

In order to secure the effect of the present application, it is preferable to set the upper limit of conditional expression (2) to 1.94.

On the other hand, when the value of conditional expression (2) is equal to or falls below the lower limit of conditional expression (2), the object side lens length from the reflection optical element, in other words, a distance along an optical axis between the most object side lens surface and an object side optical surface of the reflection optical element becomes small, so that it is suitable for thinning the zoom lens. However, a radius of curvature of the image side lens surface of the negative lens disposed to the object side of the reflection optical element becomes large, so that negative refractive power of the negative lens becomes small. In this instance, when negative refractive power of the first lens group is to be forcibly secured, curvature of field and lateral chromatic aberration are generated, so that it is undesirable.

In order to secure the effect of the present application, it is preferable to set the lower limit of conditional expression (2) to 0.80. In order to further secure the effect of the present application, it is greatly preferable to set the lower limit of conditional expression (2) to 0.90. In order to still further secure the effect of the present application, it is most preferable to set the lower limit of conditional expression (2) to 1.00.

In a zoom lens according to the present application, the following conditional expression (3) is preferably satisfied:

$$2.16 < Dp/fw \tag{3}$$

where Dp denotes a length of the reflection optical element, along the optical axis, and fw denotes a focal length of the zoom lens in the wide-angle end state.

Conditional expression (3) defines the optical path length of the reflection optical element. With satisfying conditional expression (3), a zoom lens according to the present application makes it possible to excellently correct various aberrations such as curvature of field.

When the value of conditional expression (3) is equal to or falls below the lower limit of conditional expression (3), negative refractive power of the negative lens disposed to the object side of the reflection optical element becomes excessively large. Accordingly, various aberrations such as curvature of field generated at the negative lens become difficult to be corrected by succeeding lens group, in other words, the second lens group and the third lens group, so that it is undesirable.

In order to secure the effect of the present application, it is preferable to set the lower limit of conditional expression (3) to 2.35. In order to further secure the effect of the present application, it is most preferable to set the lower limit of conditional expression (3) to 2.45.

In a zoom lens according to the present application, the second lens group and the third lens group preferably have positive refractive power.

In this manner, with disposing lens groups having positive refractive power to the image side of the first lens group, a zoom lens according to the present application becomes a retrofocus type lens configuration to accomplish a wide angle of view with suppressing various aberrations such as coma and curvature of field.

In a zoom lens according to the present application, the following conditional expression (4) is preferably satisfied:

$$0.36<(-f1)/f2<1.00 \qquad (4)$$

where f1 denotes a focal length of the first lens group, and f2 denotes a focal length of the second lens group.

Conditional expression (4) defines a ratio of the focal length of the first lens group to the focal length of the second lens group. With satisfying conditional expression (4), a zoom lens according to present application can excellently correct off-axis aberrations such as curvature of field and coma with securing a wide angle of view and a zoom ratio.

When the value of conditional expression (4) is equal to or exceeds the upper limit of conditional expression (4), a zoom lens according to the present application becomes large. Moreover, it becomes difficult to correct Petzval sum, so that off-axis aberrations such as curvature of field and coma become worse, so that it is undesirable.

In order to secure the effect of the present application, it is preferable to set the upper limit of conditional expression (4) to 0.80. In order to further secure the effect of the present application, it is most preferable to set the upper limit of conditional expression (4) to 0.70.

On the other hand, when the value of conditional expression (4) is equal to or falls below the lower limit of conditional expression (4), it becomes difficult to secure a wide angle of view and a zoom ratio. Moreover, off-axis aberrations such as curvature of field and coma become worse, so that it is undesirable.

In a zoom lens according to the present application, the following conditional expression (5) is preferably satisfied:

$$0.29<(-f1 \cdot fw)/ft^2<0.54 \qquad (5)$$

where f1 denotes a focal length of the first lens group, fw denotes a focal length of the zoom lens in the wide-angle end state, and ft denotes a focal length of the zoom lens in the telephoto end state.

Conditional expression (5) defines the focal length of the first lens group. With satisfying conditional expression (5), a zoom lens according to the present application makes it possible to excellently correct off-axis aberrations such as curvature of field and coma with securing a wide angle of view and a zoom ratio.

When the value of conditional expression (5) is equal to or exceeds the upper limit of conditional expression (5), a zoom lens according to the present application becomes large. Moreover, Petzval sum becomes difficult to be corrected. As a result, off-axis aberrations such as curvature of field and coma become worse, so that it is undesirable.

On the other hand, when the value of conditional expression (5) is equal to or falls below the lower limit of conditional expression (5), it becomes difficult to secure a wide angle of view and a zoom ratio. Moreover, off-axis aberrations such as curvature of field and coma become worse, so that it is undesirable.

In a zoom lens according to the present application, the following conditional expression (6) is preferably satisfied:

$$1.62<(-f1)/fw<2.99 \qquad (6)$$

where f1 denotes a focal length of the first lens group, and fw denotes a focal length of a zoom lens in the wide-angle end state.

Conditional expression (6) defines the focal length of the first lens group. With satisfying conditional expression (6), a zoom lens according to the present application makes it possible to excellently correct off-axis aberrations such as curvature of field and coma with securing a wide angle of view and a zoom ratio.

When the value of conditional expression (6) is equal to or exceeds the upper limit of conditional expression (6), a zoom lens according to the present application becomes large. Moreover, Petzval sum becomes difficult to be corrected. As a result, off-axis aberrations such as curvature of field and coma become worse, so that it is undesirable.

On the other hand, when the value of conditional expression (6) is equal to or falls below the lower limit of conditional expression (6), it becomes difficult to secure a wide angle of view and a zoom ratio. Moreover, off-axis aberrations such as curvature of field and coma become worse, so that it is undesirable.

In a zoom lens according to the present application, it is preferable that upon zooming from the wide-angle end state to the telephoto end state, the second lens group is moved along the optical axis only to the object side, and the third lens group is moved along the optical axis.

With this configuration, it becomes possible to excellently correct spherical aberration upon zooming from the wide-angle end state to the telephoto end state. When the second lens group is moved to the object side and to the image side upon zooming, contribution of the lens groups on and after the third lens group to zooming becomes large. As a result, it becomes difficult to correct spherical aberration upon zooming, so that it is undesirable.

Moreover, in a zoom lens according to the present application, it is preferable that the first lens group consists of, in order from the object side along the optical axis, the front group, the reflection optical element, a negative lens and a positive lens.

In case the reflection optical element is disposed to the most object side of the zoom lens according to the present application, the reflection optical element becomes large by the amount of the angle of view in the wide-angle end state. Accordingly, it is preferable that the front group having negative refractive power is disposed to the most object side of the zoom lens according to the present application as described above, and the height of the ray incident on the reflection optical element disposed to the image side thereof is made small. As a result, the reflection optical element can be compact, and thinning of the zoom lens according to the present application can be effectively accomplished.

Moreover, a zoom lens according to the present application has a character that the first lens group has negative refractive power. However, when the negative refractive power is borne only by the front group disposed to the most object side of the first lens group, aberrations generated by the front group are enlarged by the reflection optical element. Accordingly, it is preferable that a zoom lens according to the present application includes a negative lens to the image side of the reflection optical element as described above, and the front group disposed to the object side of the reflection optical element and the negative lens disposed to the image side thereof bear negative refractive power of the first lens group. Moreover, in a zoom lens according to the present application, with including a positive lens in the first lens group, it becomes possible to correct chromatic aberration, so that it is desirable.

Moreover, in a zoom lens according to the present application, the negative lens is preferably cemented with the positive lens.

With this configuration, chromatic aberration generated in the first lens group can be effectively corrected.

Moreover, in a zoom lens according to the present application, at least one lens surface in the first lens group is preferably an aspherical surface.

As described above, in a zoom lens according to the present application, with using an aspherical surface in the first lens group in which the height of off-axis ray is high, curvature of field and astigmatism are excellently corrected, and aberrations generated in the zoom lens can be excellently corrected. Moreover, generally, in a zoom lens having lens configuration, in order from an object side, a negative-positive-positive, a wider angle of view is to be achieved, negative refractive power of the first lens group becomes large, so that it becomes difficult to correct aberrations. Accordingly, at least one lens surface in the first lens group is preferably an aspherical surface as in the case of a zoom lens according to present application. This problem can also be solved by increasing the number of lens element in the first lens group. However, when the number of lens element in the first lens group is increased, the thinning of a zoom lens according to the present application cannot be accomplished, so that it is undesirable.

In a zoom lens according to the present application, the reflection optical element preferably folds the optical path by the amount of 90 degrees.

With this configuration, it becomes possible to realize a wide-angle zoom lens capable of excellently correcting various aberrations in spite of having thinned profile.

Moreover, an optical apparatus according to the present application is characterized by being equipped with the zoom lens having the above-described configuration.

With this configuration, it becomes possible to realize a downsized optical apparatus having a reflection optical element and a wide angle of view with thinning its profile by means of shortening the object side lens length from the reflection optical element, in other words, a distance along an optical axis between the most object side lens surface and an object side optical surface of the reflection optical element.

Moreover, an optical apparatus according to the present application preferably includes an imaging portion that takes an image formed by light rays transmitted through the zoom lens and generates an image signal, and a signal processor that transforms the image signal into an image signal in which distortion is corrected.

Generally, correction of distortion and correction of astigmatism tend to be a reciprocal relation. With including the signal processor, the optical apparatus according to the present application can allow distortion of the zoom lens up to a certain amount, so that it becomes possible to excellently correct astigmatism and to realize shortening the diameter of the first lens group.

Here, an example of a method for correcting distortion by the above-described signal processor is explained.

At first, the signal processor determines the image height Yw on the imaging device in the wide-angle end state on the basis of the following expression (7). Then, the signal processor transforms an image signal obtained by the imaging device in the wide-angle end state such that the image signal formed on the range of the image height Yw in the wide-angle end state is transformed into the image signal formed on the range of the image height Yt, thereby correcting distortion. Accordingly, the optical apparatus according to the present application makes it possible to obtain an image whose distortion is corrected:

$$Yw = Yt \cdot ((100 + Dist)/100) + \alpha \quad (7)$$

where Yw denotes an image height on the imaging device in the wide-angle end state, Yt denotes an image height on the imaging device in the telephoto end state, Dist denotes an amount of distortion (%) in the wide-angle end state, and $\alpha$ denotes a surplus amount on the imaging area of the imaging device.

For example, when Yt is 10 mm, Dist is −10%, $\alpha$ is 0 mm, Yw becomes 9 mm. Here, an image signal formed by an object image Yw of 9 mm is used as an image signal Yw of 10 mm, so that an image whose distortion is corrected can be obtained.

Moreover, a method for manufacturing a zoom lens according to the present application comprising steps of: disposing, in order from an object side along an optical axis, a first lens group having negative refractive power, a second lens group, and a third lens group; disposing, in order from the object side along the optical axis, a front group having negative refractive power and a reflection optical element into the first lens group; constructing the zoom lens such that a position of the first lens group on the optical axis may be fixed upon zooming from a wide-angle end state to a telephoto end state; and disposing the first lens group disposing the first lens group with satisfying the following conditional expression (1):

$$(-f1p)/Dp < 0.89 \quad (1)$$

where f1p denotes a focal length of the front group, and Dp denotes a length of the reflection optical element along the optical axis.

With the method for manufacturing a zoom lens according to the present application, it becomes possible to manufacture a downsized zoom lens having a reflection optical element and a wide angle of view with thinning its profile by means of shortening the object side lens length from the reflection optical element, in other words, a distance along an optical axis between the most object side lens surface and an object side optical surface of the reflection optical element.

Each numerical example of a zoom lens according to the present application is explained below with reference to accompanying drawings.

EXAMPLE 1

FIG. 1 is a sectional view showing a lens configuration of a zoom lens according to Example 1 of the present application together with a moving trajectory of each lens group.

The zoom lens according to Example 1 is composed of, in order from an object side along an optical axis, a first lens group G1 having negative refractive power, an aperture stop S, a second lens group G2 having positive refractive power, a third lens group G3 having positive refractive power, and a filter group FL.

The first lens group G1 is composed of, in order from the object side along the optical axis, a front group constructed by a negative meniscus lens L11 having a convex surface facing the object side, a reflection optical element P whose plane of incidence and plane of exit are constructed by plane surfaces and that folds an optical path by the amount of 90 degrees, and a cemented lens constructed by a double concave negative lens L12 cemented with a double convex positive lens L13. Incidentally, an aspherical surface is formed on both side lens surfaces of the negative meniscus lens L11, and an image side lens surface of the positive lens L13. Here, although the zoom lens according to Example 1 has a configuration that the optical path is folded by the reflection optical element by the amount of 90 degrees, FIG. 1 shows a configuration that the optical path is extended. This is the same in the following each Example.

The second lens group G2 is composed of, in order from the object side along the optical axis, a double convex positive lens L21, a cemented lens constructed by a double convex positive lens L22 cemented with a double concave negative lens L23, and a cemented lens constructed by a negative meniscus lens L24 having a convex surface facing the object side cemented with a double convex positive lens L25. Incidentally, an aspherical surface is formed on the image side lens surface of the positive lens L25.

The third lens group G3 is composed of, in order from the object side along the optical axis, only a cemented lens constructed by a double convex positive lens L31 cemented with a negative meniscus lens L32 having a concave surface facing the object side. Incidentally, an aspherical surface is formed on the object side lens surface of the positive lens L31.

The filter group FL is composed of a low-pass filter, an infrared-light-blocking filter, and the like.

With this configuration, in the zoom lens according to Example 1, upon zooming from a wide-angle end state to a telephoto end state, a position of the first lens group G1 is fixed, the second lens group G2 is moved along the optical axis only to the object side, and the third lens group G3 is moved along the optical axis only to the image side. In this instance, the aperture stop S is moved in a body with the second lens group G2.

Moreover, in the zoom lens according to Example 1, the third lens group G3 is preferably moved along the optical axis, thereby carrying out focusing from an infinitely distant object to a close object.

Various values associated with the zoom lens according to Example 1 are listed in Table 1. In (Specifications) in Table 1, W denotes a wide-angle end state, M denotes an intermediate focal length state, T denotes a telephoto end state, f denotes a focal length of the zoom lens, FNO denotes an f-number, ω denotes a half angle of view (unit: degree), Y denotes an image height, TL denotes a total lens length, and BF denotes a back focal length. In (Lens Surface Data), "OP" denotes an object plane, "I" denotes an image plane, the leftmost column "m" shows the lens surface number counted in order from the object side, the second column "r" shows a radius of curvature of the lens surface, the third column "d" shows a distance to the next optical surface, the fourth column "nd" shows a refractive index at d-line (wavelength λ=587.6 nm), and the fifth column "vd" shows an Abbe number at d-line (wavelength λ=587.6 nm). In (Lens Surface Data), r=∞ indicates a plane surface. In the fourth column "nd", the refractive index of air nd=1.0000 is omitted.

Each aspherical surface is expressed in (Lens surface Data) by attaching "*" to the left side of the surface number and a paraxial radius of curvature is shown in the column "r".

In (Aspherical Surface Date), an aspherical surface is expressed by the following expression:

$$x(y)=(y^2/R)/(1+(1-\kappa(y^2/R^2))^{1/2})+C4\times y^4+C6\times y^6+C8\times y^8+C10\times y^{10}$$

where "y" denotes a vertical height from the optical axis, x(y) denotes a sag amount which is a distance along the optical axis from the tangent surface at the vertex of the aspherical surface to the aspherical surface at the vertical height y from the optical axis, R denotes a radius of curvature of a reference sphere (paraxial radius of curvature), κ denotes a conical coefficient, and Cn denotes an aspherical coefficient of n-th order. In (Aspherical Surface Data), "E-n" denotes "×10$^{-n}$", in which "n" is an integer, and for example "1.234E-05" denotes "1.234×10$^{-5}$". Aspherical coefficient C2 of the second order is zero.

In (Lens Group Data), a starting surface number "ST" and a focal length of each lens group are shown.

In (Values for Conditional Expressions), values for respective conditional expressions are shown.

In respective tables for various values, "mm" is generally used for the unit of length such as the focal length, the radius of curvature and the distance to the next lens surface. However, since similar optical performance can be obtained by an optical system proportionally enlarged or reduced its dimension, the unit is not necessarily to be limited to "mm", and any other suitable unit can be used. The explanation of reference symbols is the same in the other Examples.

TABLE 1

(Specifications)
Zoom Ratio = 2.35

| | W | M | T |
|---|---|---|---|
| f = | 2.96 | 4.50 | 6.96 |
| FNO = | 3.53 | 4.64 | 5.95 |
| ω = | 54.18 | 42.61 | 29.85 |
| Y = | 3.65 | 4.05 | 4.05 |
| TL = | 49.12 | 49.12 | 49.12 |
| BF = | 0.40 | 0.40 | 0.40 |

(Lens Surface Data)

| m | r | d | nd | vd |
|---|---|---|---|---|
| OP | ∞ | | | |
| *1 | 87.0668 | 0.8342 | 1.8513 | 40.10 |
| *2 | 5.6360 | 3.6085 | | |
| 3 | ∞ | 8.5000 | 1.9037 | 31.31 |
| 4 | ∞ | 0.9000 | | |
| 5 | −13.5544 | 0.6000 | 1.8830 | 40.80 |
| 6 | 489.4156 | 2.1878 | 1.8211 | 24.05 |
| *7 | −12.6650 | (d7) | | |
| 8 | ∞ | 0.2000 | Aperture Stop S | |
| 9 | 16.9159 | 2.3000 | 1.9037 | 31.31 |
| 10 | −98.9564 | 0.3693 | | |
| 11 | 5.8410 | 3.0000 | 1.4970 | 81.60 |
| 12 | −11.2426 | 1.0000 | 1.9037 | 31.31 |
| 13 | 6.6555 | 0.5006 | | |
| 14 | 97.1653 | 0.8778 | 1.6259 | 35.74 |
| 15 | 6.5121 | 2.2423 | 1.5920 | 67.02 |
| *16 | −8.1041 | (d16) | | |
| *17 | 18.2455 | 2.0607 | 1.7725 | 49.62 |
| 18 | −15.1540 | 0.7174 | 1.8467 | 23.78 |
| 19 | −21.2452 | (d19) | | |
| 20 | ∞ | 0.2000 | 1.5168 | 64.19 |
| 21 | ∞ | 0.4000 | | |
| 22 | ∞ | 0.5000 | 1.5168 | 64.19 |
| 23 | ∞ | 0.4000 | | |
| I | ∞ | | | |

(Aspherical Surface Data)

Surface Number: 1

κ = 1
C4 = 8.77306E−4
C6 = −2.20401E−5
C8 = 2.30383E−7
C10 = −7.24634E−10

TABLE 1-continued

Surface Number: 2

$\kappa = 1$
$C4 = 4.75343E-4$
$C6 = 1.75058E-5$
$C8 = -1.87900E-6$
$C10 = 7.56548E-9$ Surface Number: 7

$\kappa = 1$
$C4 = -4.59561E-5$
$C6 = -7.77004E-6$
$C8 = 6.78126E-7$
$C10 = -2.04242E-8$ Surface Number: 16

$\kappa = 1$
$C4 = 1.13943E-4$
$C6 = -2.61009E-6$
$C8 = 0.00000E+0$
$C10 = 0.00000E+0$ Surface Number: 17

$\kappa = 1$
$C4 = -2.04178E-4$
$C6 = 2.60289E-6$
$C8 = -2.86408E-7$
$C10 = 5.83704E-9$ (Variable Distances)

|      | W       | M      | T       |
|------|---------|--------|---------|
| d7 = | 10.9023 | 6.2000 | 1.0000  |
| d16 =| 3.0000  | 9.1615 | 15.1319 |
| d19 =| 3.82526 | 2.36645| 1.59560 |

(Lens Group Data)

| Group | ST | Focal Length |
|-------|----|--------------|
| G1    | 1  | -8.831       |
| G2    | 9  | 13.431       |
| G3    | 17 | 13.335       |

(Values for Conditional Expressions)

f1p = -7.112
D1p = 4.442
fw = 2.961
Dp = 8.500
f1 = -8.831
f2 = 13.431
ft = 6.963
(1): (-f1p)/Dp = 0.837
(2): D1p/fw = 1.500
(3): Dp/fw = 2.870
(4): (-f1)/f2 = 0.658
(5): (-f1 · fw)/ft² = 0.539
(6): (-f1)/fw = 2.982

Figure 2A:
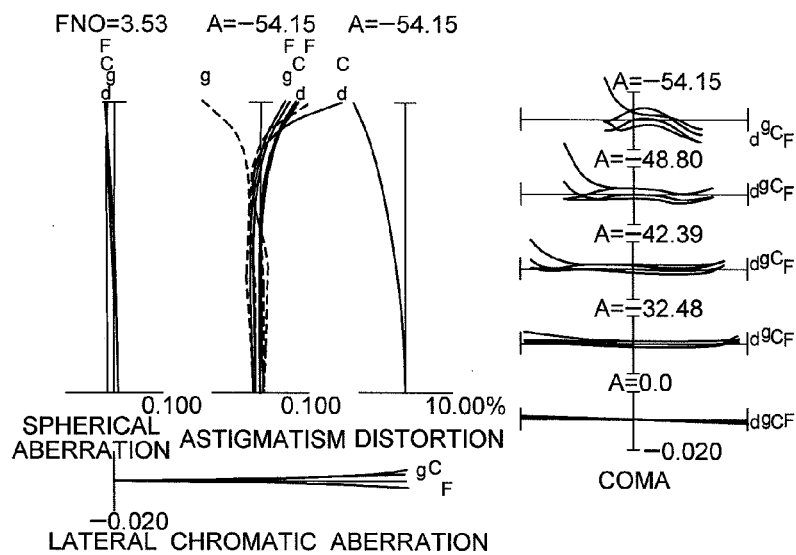
Figure 2B:
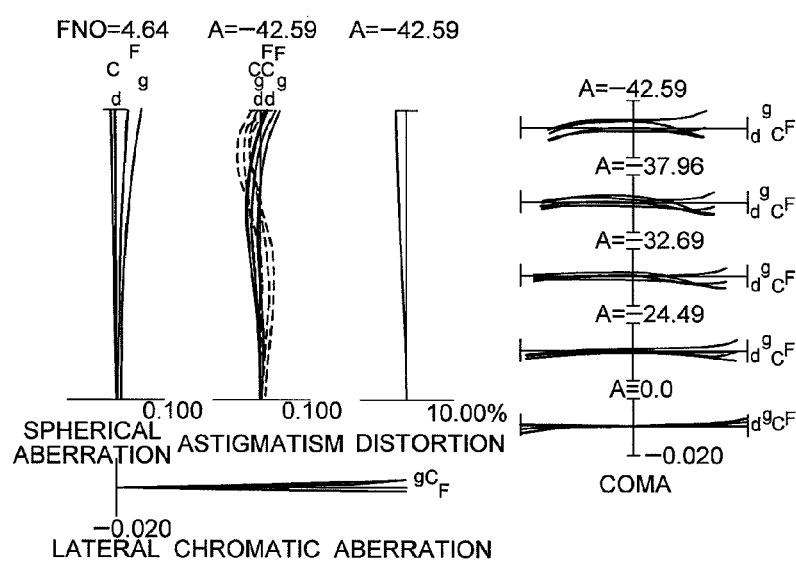
Figure 2C:
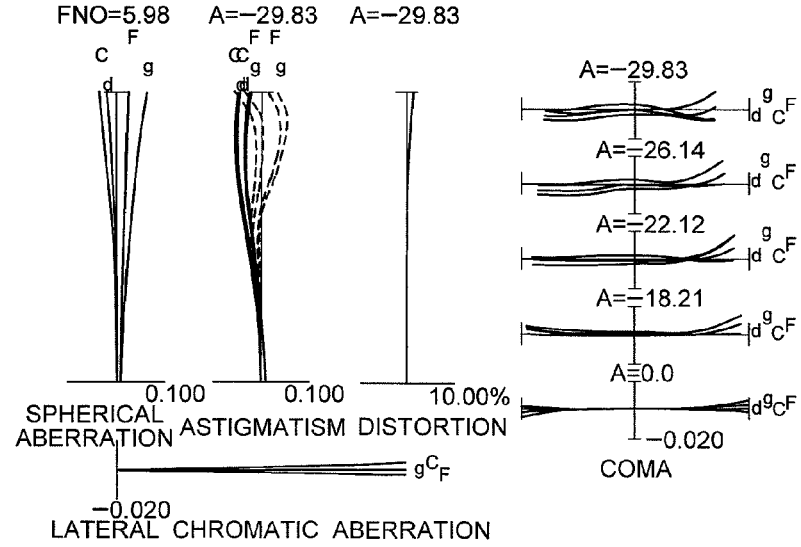

FIGS. 2A, 2B and 2C are graphs showing various aberrations of the zoom lens according to Example 1 of the present application upon focusing on an infinitely distant object, in which FIG. 2A shows various aberrations in a wide-angle end state, FIG. 2B shows various aberrations in an intermediate focal length state, and FIG. 2C shows various aberrations in a telephoto end state.

In respective graphs, FNO denotes an f-number, A denotes a half angle of view (unit: degree), d indicates an aberration curve at d-line (wavelength λ=587.6 nm), g indicates an aberration curve at g-line (wavelength λ=435.8 nm), C indicates an aberration curve at C-line (wavelength λ=656.3 nm), and F indicates an aberration curve at F-line (wavelength λ=486.1 nm). In graphs showing astigmatism, a solid line indicates a sagittal image plane, and a broken line indicates a meridional image plane. The above-described explanations regarding various aberration graphs are the same as the other Examples.

As is apparent from the respective graphs, the zoom lens according to Example 1 shows superb optical performance as a result of good corrections to various aberrations in each focal length state from the wide-angle end state through the telephoto end state.

EXAMPLE 2

Figure 3:
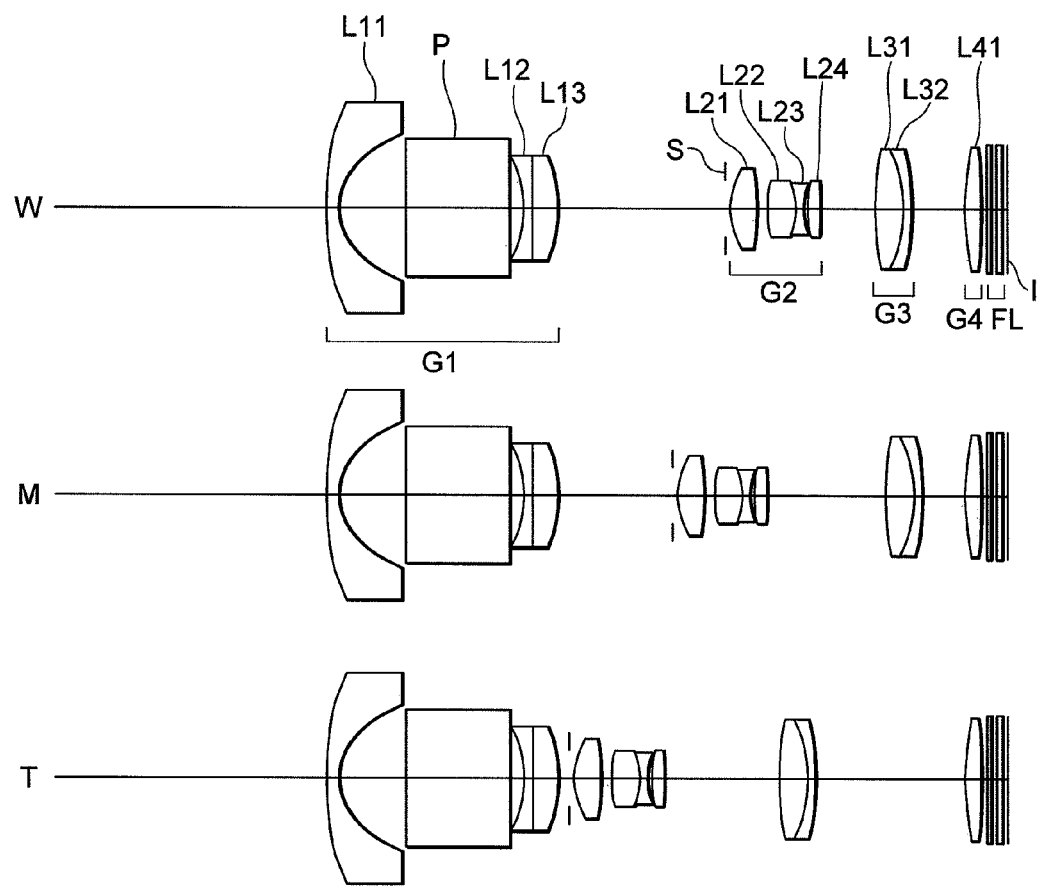
FIG. 3 shows a lens configuration of a zoom lens according to Example 2 of the present application.

FIG. 3 is a sectional view showing a lens configuration of a zoom lens according to Example 2 of the present application together with a moving trajectory of each lens group.

The zoom lens according to Example 2 is composed of, in order from an object side along an optical axis, a first lens group G1 having negative refractive power, an aperture stop S, a second lens group G2 having positive refractive power, a third lens group G3 having positive refractive power, a fourth lens group G4 having positive refractive power, and a filter group FL.

The first lens group G1 is composed of, in order from the object side along the optical axis, a front group constructed by a negative meniscus lens L11 having a convex surface facing the object side, a reflection optical element P whose plane of incidence and plane of exit are constructed by plane surfaces and that folds an optical path by the amount of 90 degrees, and a cemented lens constructed by a double concave negative lens L12 cemented with a double convex positive lens L13. Incidentally, an aspherical surface is formed on both side lens surfaces of the negative meniscus lens L11, and an image side lens surface of the positive lens L13.

The second lens group G2 is composed of, in order from the object side along the optical axis, a double convex positive lens L21, a cemented lens constructed by a double convex positive lens L22 cemented with a double concave negative lens L23, and a double convex positive lens L24. Incidentally, an aspherical surface is formed on the object side lens surface of the positive lens L21.

The third lens group G3 is composed of, in order from the object side along the optical axis, only a cemented lens constructed by a double convex positive lens L31 cemented with a negative meniscus lens L32 having a concave surface facing the object side. Incidentally, an aspherical surface is formed on the image side lens surface of the negative meniscus lens L32.

The fourth lens group G4 is composed of only a double convex positive lens L41.

The filter group FL is composed of a low-pass filter, an infrared-light-blocking filter, and the like.

With this configuration, in the zoom lens according to Example 2, upon zooming from a wide-angle end state to a telephoto end state, positions of the first lens group G1 and the fourth lens group G4 are fixed, the second lens group G2 is moved along the optical axis only to the object side, and the third lens group G3 is moved along the optical axis at first to the image side and then to the object side. In this instance, the aperture stop S is moved in a body with the second lens group G2.

Moreover, in the zoom lens according to Example 2, the third lens group G3 is preferably moved along the optical axis, thereby carrying out focusing from an infinitely distant object to a close object.

Various values associated with the zoom lens according to Example 2 are listed in Table 2.

TABLE 2

(Specifications)
Zoom Ratio = 2.35

|  | W | M | T |
|---|---|---|---|
| f = | 2.96 | 4.10 | 6.96 |
| FNO = | 3.48 | 4.22 | 5.21 |
| ω = | 55.43 | 45.53 | 29.35 |
| Y = | 3.65 | 4.05 | 4.05 |
| TL = | 49.80 | 49.80 | 49.80 |
| BF = | 0.40 | 0.40 | 0.40 |

(Lens Surface Data)

| m | r | d | nd | νd |
|---|---|---|---|---|
| OP | ∞ |  |  |  |
| *1 | 198.1863 | 0.8800 | 1.8513 | 40.10 |
| *2 | 5.4842 | 4.8602 |  |  |
| 3 | ∞ | 7.5000 | 1.8040 | 46.57 |
| 4 | ∞ | 1.0000 |  |  |
| 5 | −8.7305 | 0.6500 | 1.8830 | 40.80 |
| 6 | 117.2047 | 2.0000 | 1.8049 | 24.73 |
| *7 | −10.2991 | (d7) |  |  |
| 8 | ∞ | 0.3000 | Aperture Stop S | |
| *9 | 5.7427 | 2.0000 | 1.5831 | 59.46 |
| 10 | −24.9984 | 0.8000 |  |  |
| 11 | 11.7966 | 2.0000 | 1.496997 | 81.60 |
| 12 | −4.9267 | 0.5000 | 1.8340 | 37.34 |
| 13 | 6.0102 | 0.3500 |  |  |
| 14 | 13.3668 | 0.9400 | 1.6935 | 53.34 |
| 15 | −29.0577 | (d15) |  |  |
| 16 | 20.5566 | 2.0500 | 1.4970 | 81.60 |
| 17 | −9.9896 | 0.5000 | 1.6990 | 30.05 |
| *18 | −21.7498 | (d18) |  |  |
| 19 | 11.3396 | 1.2800 | 1.5311 | 55.91 |
| 20 | −65.0000 | 0.5000 |  |  |
| 21 | ∞ | 0.2000 | 1.5168 | 64.19 |
| 22 | ∞ | 0.4000 |  |  |
| 23 | ∞ | 0.5000 | 1.5168 | 64.19 |
| 24 | ∞ | 0.4000 |  |  |
| I | ∞ |  |  |  |

(Aspherical Surface Data)

Surface Number: 1

κ = 1
C4 = 9.85162E−4
C6 = −1.63605E−5
C8 = 9.41754E−8
C10 = 0.00000E+0

Surface Number: 2

κ = 1
C4 = 6.86750E−4
C6 = 9.53669E−6
C8 = 1.40821E−6
C10 = −9.01097E−8

Surface Number: 7

κ = 1
C4 = −3.66861E−5
C6 = −4.91103E−6
C8 = 5.03271E−7
C10 = −1.36247E−8

Surface Number: 9

κ = 1
C4 = −2.09619E−4
C6 = −2.43140E−7
C8 = 0.00000E+0
C10 = 0.00000E+0

Surface Number: 18

κ = 1
C4 = −7.01883E−4
C6 = −1.54358E−5

TABLE 2-continued

C8 = 0.00000E+0
C10 = 0.00000E+0

(Variable Distances)

|  | W | M | T |
|---|---|---|---|
| d7 = | 12.5680 | 8.6329 | 1.01294 |
| d15 = | 4.0748 | 8.9119 | 8.5836 |
| d18 = | 3.9020 | 3.0000 | 10.9482 |

(Lens Group Data)

| Group | ST | Focal Length |
|---|---|---|
| G1 | 1 | −6.099 |
| G2 | 9 | 12.458 |
| G3 | 16 | 28.044 |
| G4 | 19 | 18.286 |

(Values for Conditional Expressions)

f1p = −6.639
D1p = 5.704
fw = 2.960
Dp = 7.500
f1 = −6.099
f2 = 12.458
ft = 6.964
(1): (−f1p)/Dp = 0.885
(2): D1p/fw = 1.927
(3): Dp/fw = 2.534
(4): (−f1)/f2 = 0.490
(5): (−f1 · fw)/ft$^2$ = 0.372
(6): (−f1)/fw = 2.061

Figure 4A:
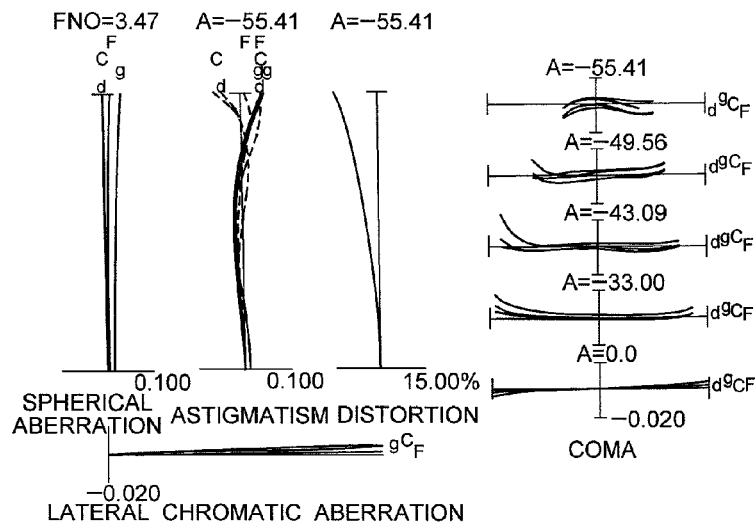
Figure 4B:
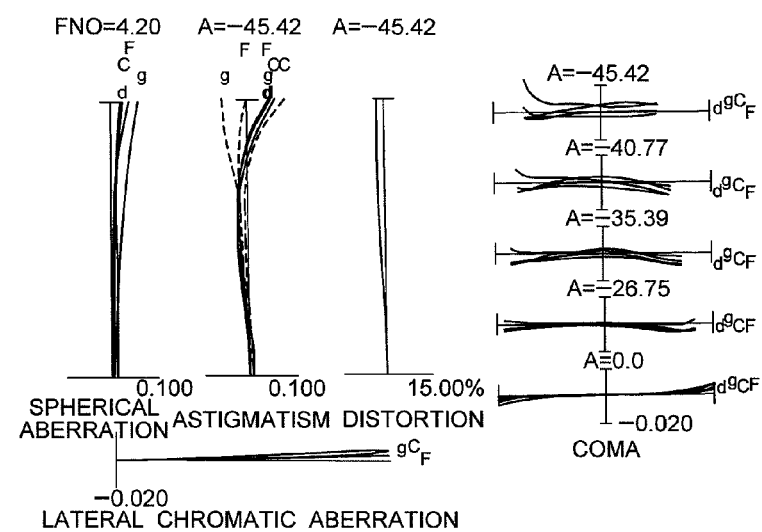
Figure 4C:
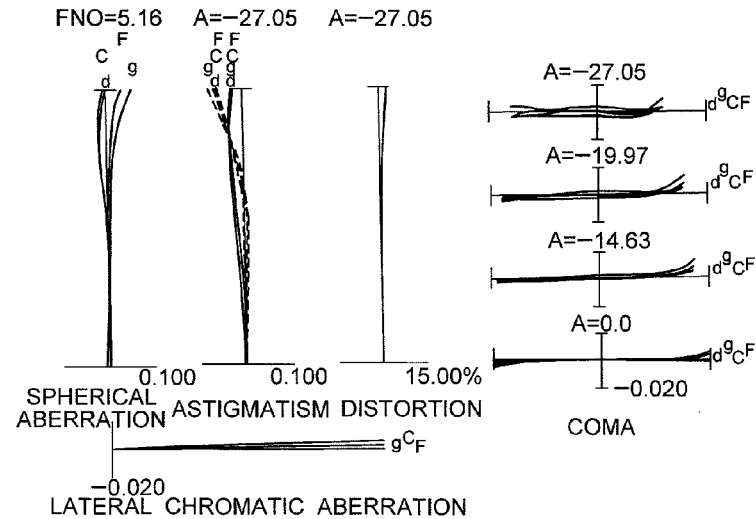

FIGS. 4A, 4B and 4C are graphs showing various aberrations of the zoom lens according to Example 2 of the present application upon focusing on an infinitely distant object, in which FIG. 4A shows various aberrations in a wide-angle end state, FIG. 4B shows various aberrations in an intermediate focal length state, and FIG. 4C shows various aberrations in a telephoto end state.

As is apparent from the respective graphs, the zoom lens according to Example 2 shows superb optical performance as a result of good corrections to various aberrations in each focal length state from the wide-angle end state through the telephoto end state.

EXAMPLE 3

Figure 5:
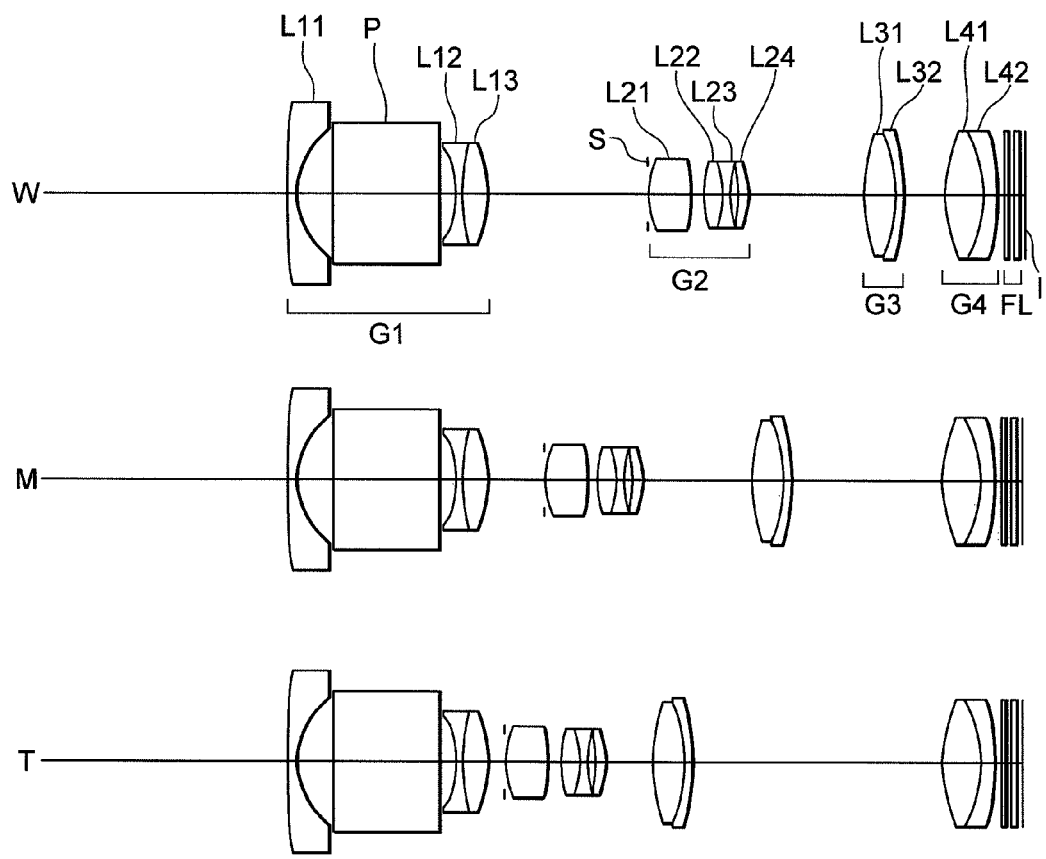
FIG. 5 shows a lens configuration of a zoom lens according to Example 3 of the present application.

FIG. 5 is a sectional view showing a lens configuration of a zoom lens according to Example 3 of the present application together with a moving trajectory of each lens group.

The zoom lens according to Example 3 is composed of, in order from an object side along an optical axis, a first lens group G1 having negative refractive power, an aperture stop S, a second lens group G2 having positive refractive power, a third lens group G3 having positive refractive power, a fourth lens group G4 having positive refractive power, and a filter group FL.

The first lens group G1 is composed of, in order from the object side along the optical axis, a front group constructed by a negative meniscus lens L11 having a convex surface facing the object side, a reflection optical element P whose plane of incidence and plane of exit are constructed by plane surfaces and that folds an optical path by the amount of 90 degrees, and a cemented lens constructed by a double concave negative lens L12 cemented with a double convex positive lens L13. Incidentally, an aspherical surface is formed on both side lens surfaces of the negative meniscus lens L11, and an image side lens surface of the positive lens L13.

The second lens group G2 is composed of, in order from the object side along the optical axis, a double convex positive lens L21, a cemented lens constructed by a double convex positive lens L22 cemented with a double concave negative lens L23, and a positive meniscus lens L24 having a concave surface facing the object side. Incidentally, an aspherical surface is formed on both lens surfaces of the positive lens L21.

The third lens group G3 is composed of, in order from the object side along the optical axis, only a cemented lens constructed by a double convex positive lens L31 cemented with a negative meniscus lens L32 having a concave surface facing the object side.

The fourth lens group G4 is composed of, in order from the object side along the optical axis, only a cemented lens constructed by a double convex positive lens L41 cemented with a negative meniscus lens L42 having a concave surface facing the object side. Incidentally, an aspherical surface is formed on the object side lens surface of the positive lens L41.

The filter group FL is composed of a low-pass filter, an infrared-light-blocking filter, and the like.

With this configuration, in the zoom lens according to Example 3, upon zooming from a wide-angle end state to a telephoto end state, positions of the first lens group G1 and the fourth lens group G4 are fixed, the second lens group G2 and the third lens group G3 are moved along the optical axis only to the object side. In this instance, the aperture stop S is moved in a body with the second lens group G2.

Moreover, in the zoom lens according to Example 3, the third lens group G3 is preferably moved along the optical axis, thereby carrying out focusing from an infinitely distant object to a close object.

Various values associated with the zoom lens according to Example 3 are listed in Table 3.

TABLE 3

(Specifications)
Zoom Ratio = 2.35

|  | W | M | T |
|---|---|---|---|
| f = | 2.96 | 4.91 | 6.96 |
| FNO = | 3.66 | 4.27 | 5.05 |
| ω = | 55.89 | 39.75 | 28.80 |
| Y = | 3.65 | 4.05 | 4.05 |
| TL = | 53.89 | 53.89 | 53.89 |
| BF = | 0.40 | 0.40 | 0.40 |

(Lens Surface Data)

| m | r | d | nd | vd |
|---|---|---|---|---|
| OP | ∞ |  |  |  |
| *1 | 4216.1852 | 0.6000 | 1.8513 | 40.10 |
| *2 | 5.3683 | 2.6413 |  |  |
| 3 | ∞ | 7.7000 | 1.8040 | 46.57 |
| 4 | ∞ | 1.2000 |  |  |
| 5 | −7.0995 | 0.5351 | 1.8830 | 40.80 |
| 6 | 18.5486 | 1.8998 | 1.8048 | 24.73 |
| *7 | −9.4688 | (d7) |  |  |
| 8 | ∞ | 0.1 | Aperture Stop S |  |
| *9 | 7.0238 | 2.9989 | 1.5891 | 61.25 |
| *10 | −21.8747 | 1.0000 |  |  |
| 11 | 8.8930 | 1.3893 | 1.4969 | 81.60 |
| 12 | −8.2060 | 0.5000 | 1.8340 | 37.34 |
| 13 | 7.9729 | 0.6128 |  |  |
| 14 | −12.6989 | 0.7262 | 1.7199 | 50.34 |
| 15 | −9.5168 | (d15) |  |  |
| 16 | 15.1315 | 2.3811 | 1.4969 | 81.60 |
| 17 | −11.0000 | 0.5000 | 1.6989 | 30.05 |
| 18 | −20.7664 | (d18) |  |  |
| *19 | 8.4000 | 3.0000 | 1.4874 | 70.44 |
| 20 | −9.2000 | 1.0000 | 1.9036 | 31.31 |

TABLE 3-continued

| 21 | −18.6066 | 0.5000 |  |  |
| 22 | ∞ | 0.2000 | 1.5167 | 64.19 |
| 23 | ∞ | 0.4000 |  |  |
| 24 | ∞ | 0.5000 | 1.5167 | 64.19 |
| 25 | ∞ | 0.4000 |  |  |
| I | ∞ |  |  |  |

(Aspherical Surface Data)

Surface Number: 1

$\kappa = 1$
$C4 = 1.32997E{-}4$
$C6 = 9.81077E{-}6$
$C8 = -3.49610E{-}7$
$C10 = 3.32818E{-}9$ Surface Number: 2

$\kappa = 1$
$C4 = -5.57781E{-}4$
$C6 = -2.21220E{-}5$
$C8 = 2.23257E{-}6$
$C10 = -1.03032E{-}7$ Surface Number: 7

$\kappa = 1$
$C4 = -2.29120E{-}5$
$C6 = -7.02462E{-}6$
$C8 = 7.27296E{-}7$
$C10 = -2.41260E{-}8$ Surface Number: 9

$\kappa = 1$
$C4 = -5.42698E{-}5$
$C6 = 2.84884E{-}5$
$C8 = -3.99752E{-}6$
$C10 = 3.52551E{-}7$ Surface Number: 10

$\kappa = 1$
$C4 = 3.33188E{-}4$
$C6 = 4.47444E{-}5$
$C8 = -5.97450E{-}6$
$C10 = 4.98472E{-}7$ Surface Number: 19

$\kappa = 1$
$C4 = -2.96190E{-}4$
$C6 = -2.19516E{-}5$
$C8 = 3.85472E{-}7$
$C10 = -2.49988E{-}8$ (Variable Distances)

|  | W | M | T |
|---|---|---|---|
| d7 = | 11.63417 | 3.98852 | 1.0000 |
| d15 = | 8.47522 | 7.95169 | 3.60000 |
| d18 = | 3.00000 | 11.16918 | 18.50940 |

(Lens Group Data)

| Group | ST | Focal Length |
|---|---|---|
| G1 | 1 | −4.824 |
| G2 | 9 | 13.727 |
| G3 | 16 | 21.196 |
| G4 | 19 | 16.530 |

(Values for Conditional Expressions)

f1p = −6.314
D1p = 3.241
fw = 2.960
Dp = 7.700
f1 = −4.824
f2 = 13.727
ft = 6.960
(1): (−f1p)/Dp = 0.820
(2): D1p/fw = 1.095

TABLE 3-continued (3): Dp/fw = 2.601
(4): (−f1)/f2 = 0.351
(5): (−f1 · fw)/ft$^2$ = 0.295
(6): (−f1)/fw = 1.630

Figure 6A:
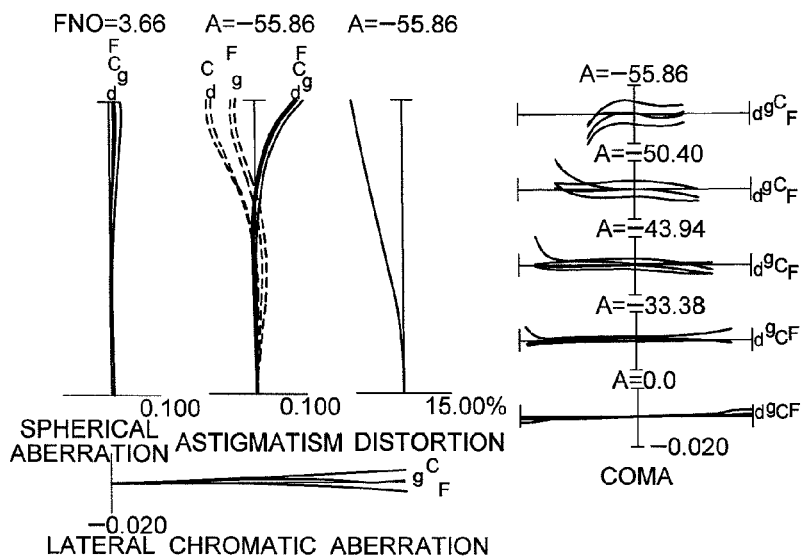
Figure 6B:
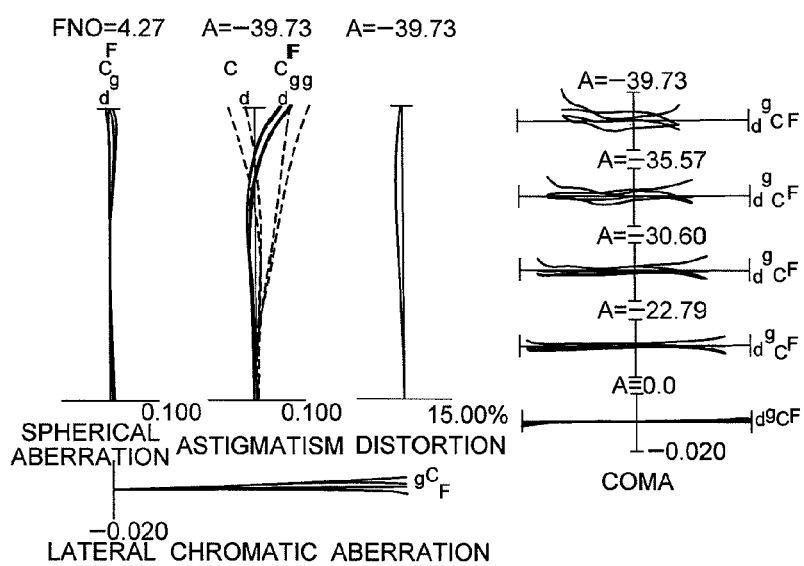
Figure 6C:
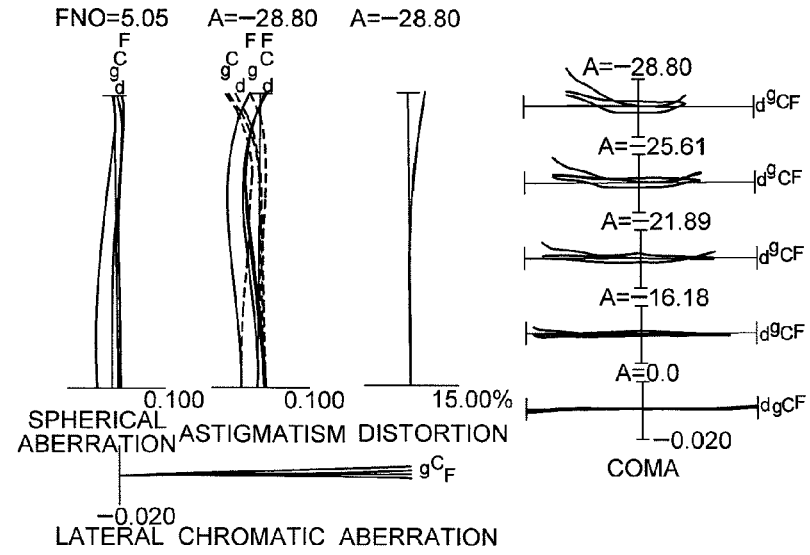

FIGS. 6A, 6B and 6C are graphs showing various aberrations of the zoom lens according to Example 3 of the present application upon focusing on an infinitely distant object, in which FIG. 6A shows various aberrations in a wide-angle end state, FIG. 6B shows various aberrations in an intermediate focal length state, and FIG. 6C shows various aberrations in a telephoto end state.

As is apparent from the respective graphs, the zoom lens according to Example 3 shows superb optical performance as a result of good corrections to various aberrations in each focal length state from the wide-angle end state through the telephoto end state.

EXAMPLE 4

Figure 7:
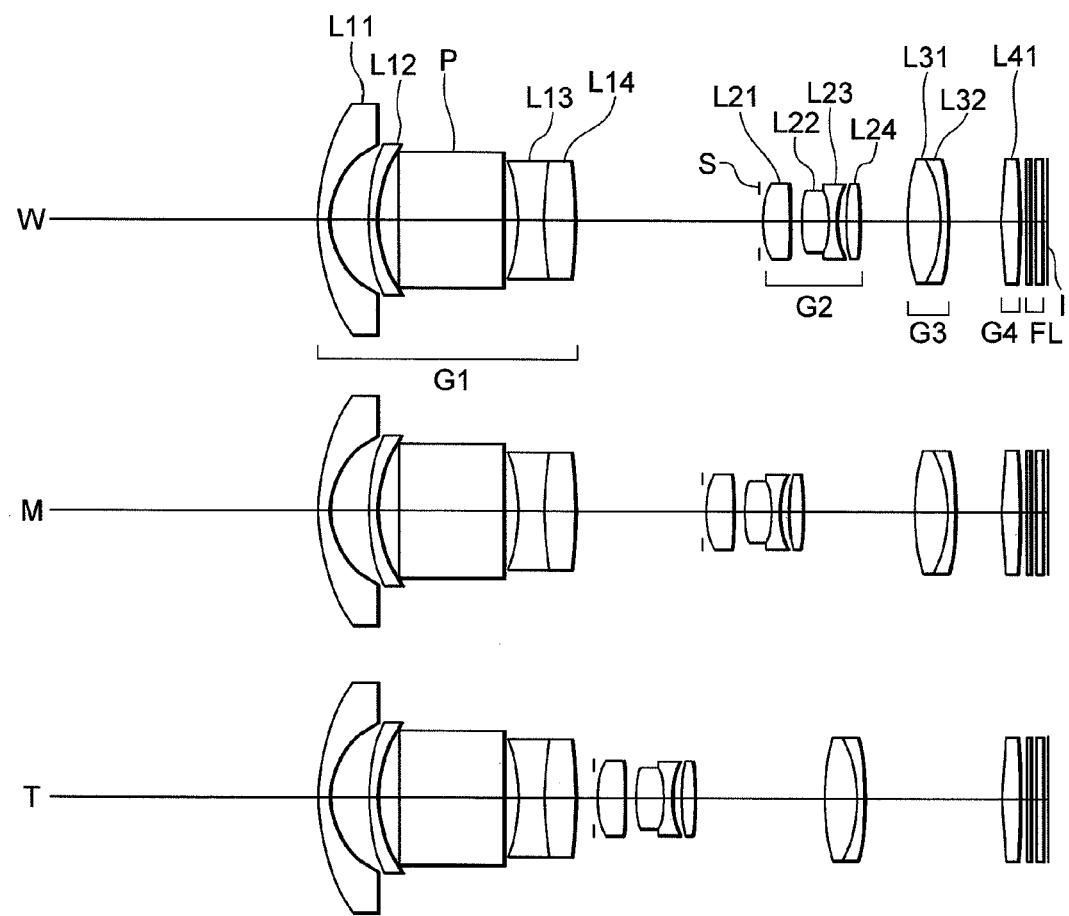
FIG. 7 shows a lens configuration of a zoom lens according to Example 4 of the present application.

FIG. 7 is a sectional view showing a lens configuration of a zoom lens according to Example 4 of the present application together with a moving trajectory of each lens group.

The zoom lens according to Example 4 is composed of, in order from an object side along an optical axis, a first lens group G1 having negative refractive power, an aperture stop S, a second lens group G2 having positive refractive power, a third lens group G3 having positive refractive power, a fourth lens group G4 having positive refractive power, and a filter group FL.

The first lens group G1 is composed of, in order from the object side along the optical axis, a front group constructed by a negative meniscus lens L11 having a convex surface facing the object side and a negative meniscus lens L12 having a convex surface facing the object side, a reflection optical element P whose plane of incidence and plane of exit are constructed by plane surfaces and that folds an optical path by the amount of 90 degrees, and a cemented lens constructed by a double concave negative lens L13 cemented with a double convex positive lens L14. Incidentally, an aspherical surface is formed on both side lens surfaces of the negative meniscus lens L11 and an image side lens surface of the positive lens L14.

The second lens group G2 is composed of, in order from the object side along the optical axis, a double convex positive lens L21, a cemented lens constructed by a double convex positive lens L22 cemented with a double concave negative lens L23, and a double convex positive lens L24. Incidentally, an aspherical surface is formed on the object side lens surface of the positive lens L21.

The third lens group G3 is composed of, in order from the object side along the optical axis, only a cemented lens constructed by a double convex positive lens L31 cemented with a negative meniscus lens L32 having a concave surface facing the object side.

The fourth lens group G4 is composed of only a double convex positive lens L41. Incidentally, an aspherical surface is formed on the object side lens surface of the positive lens L41.

The filter group FL is composed of a low-pass filter, an infrared-light-blocking filter, and the like.

With this configuration, in the zoom lens according to Example 4, upon zooming from a wide-angle end state to a telephoto end state, positions of the first lens group G1 and the fourth lens group G4 are fixed, the second lens group G2 is moved along the optical axis only to the object side, and the third lens group G3 is moved along the optical axis at first to the image side and then to the object side. In this instance, the aperture stop S is moved in a body with the second lens group G2.

Moreover, in the zoom lens according to Example 4, the third lens group G3 is preferably moved along the optical axis, thereby carrying out focusing from an infinitely distant object to a close object.

Various values associated with the zoom lens according to Example 4 are listed in Table 4.

TABLE 4

(Specifications)
Zoom Ratio = 2.35

|  | W | M | T |
|---|---|---|---|
| f = | 2.96 | 4.10 | 6.96 |
| FNO = | 3.54 | 4.30 | 5.29 |
| ω = | 55.41 | 45.66 | 29.34 |
| Y = | 3.65 | 4.05 | 4.05 |
| TL = | 52.40 | 52.40 | 52.40 |
| BF = | 0.40 | 0.40 | 0.40 |

(Lens Surface Data)

| m | r | d | nd | νd |
|---|---|---|---|---|
| OP | ∞ | | | |
| *1 | 36.3318 | 0.8000 | 1.851348 | 40.10 |
| *2 | 6.7760 | 2.8000 | | |
| 3 | 15.7352 | 0.6000 | 1.883000 | 40.80 |
| 4 | 9.3516 | 1.5400 | | |
| 5 | ∞ | 7.5000 | 1.804000 | 46.57 |
| 6 | ∞ | 1.0000 | | |
| 7 | −11.7332 | 1.8500 | 1.883000 | 40.80 |
| 8 | 38.2677 | 2.2000 | 1.821145 | 24.05 |
| *9 | −14.7260 | (d9) | | |
| 10 | ∞ | 0.3000 | Aperture Stop S | |
| *11 | 6.0463 | 2.0000 | 1.583130 | 59.46 |
| 12 | −21.8200 | 0.8000 | | |
| 13 | 11.5120 | 2.0000 | 1.496997 | 81.60 |
| 14 | −5.8738 | 0.5500 | 1.834001 | 37.34 |
| 15 | 5.9946 | 0.7300 | | |
| 16 | 15.2923 | 0.9400 | 1.693504 | 53.34 |
| 17 | −33.0389 | (d17) | | |
| 18 | 17.8239 | 2.3600 | 1.496997 | 81.60 |
| 19 | −9.7954 | 0.5200 | 1.698950 | 30.05 |
| 20 | −21.6183 | (d20) | | |
| *21 | 14.3485 | 1.2800 | 1.531100 | 55.91 |
| 22 | −85.1654 | 0.5000 | | |
| 23 | ∞ | 0.2000 | 1.516800 | 64.19 |
| 24 | ∞ | 0.4000 | | |
| 25 | ∞ | 0.5000 | 1.516800 | 64.19 |
| 26 | ∞ | 0.4000 | | |
| I | ∞ | | | |

(Aspherical Surface Data)

Surface Number: 1

κ = 1
C4 = 9.91980E−4
C6 = −1.96234E−5
C8 = 1.86478E−7
C10 = −6.98907E−10

Surface Number: 2

κ = 1
C4 = 9.36261E−4
C6 = 1.88300E−5
C8 = −9.38647E−7
C10 = 8.65219E−9

Surface Number: 9

κ = 1
C4 = −6.00443E−5

TABLE 4-continued

C6 = 1.97040E−6
C8 = 0.00000E+0
C10 = 0.00000E+0
Surface Number: 11

κ = 1
C4 = −2.77742E−4
C6 = −1.89349E−6
C8 = 0.00000E+0
C10 = 0.00000E+0
Surface Number: 21

κ = 1
C4 = −1.67697E−3
C6 = 9.66606E−5
C8 = −5.75704E−6
C10 = 1.20602E−7

(Variable Distances)

|       | W        | M       | T       |
|-------|----------|---------|---------|
| d9 =  | 13.22754 | 9.20338 | 1.24966 |
| d17 = | 3.51517  | 8.42539 | 9.43976 |
| d20 = | 3.88606  | 3.00000 | 9.93936 |

(Lens Group Data)

| Group | ST | Focal Length |
|-------|----|--------------|
| G1    | 1  | −6.262       |
| G2    | 11 | 12.782       |
| G3    | 18 | 25.640       |
| G4    | 21 | 23.225       |

(Values for Conditional Expressions)

f1p = −6.641
D1p = 5.740
fw = 2.962
Dp = 7.500
f1 = −6.262
f2 = 12.782
ft = 6.964
(1): (−f1p)/Dp = 0.886
(2): D1p/fw = 1.938
(3): Dp/fw = 2.532
(4): (−f1)/f2 = 0.490
(5): (−f1 · fw)/ft$^2$ = 0.382
(6): (−f1)/fw = 0.382

Figure 8A:
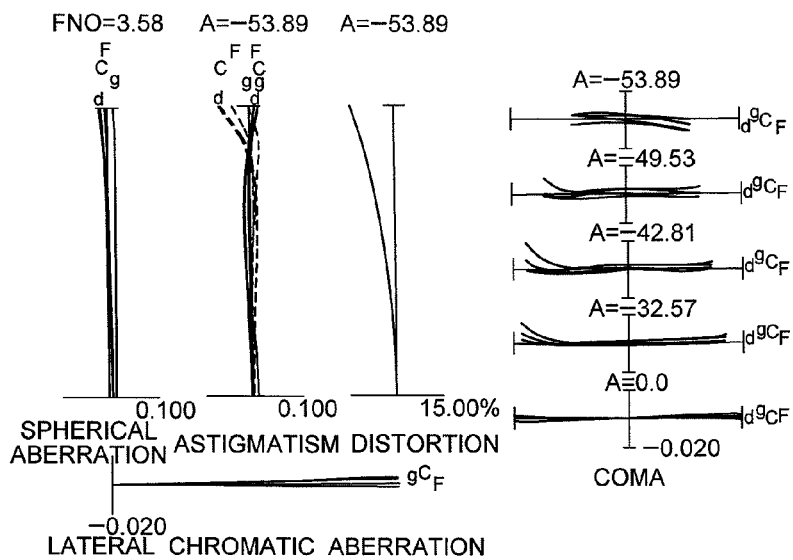
Figure 8B:
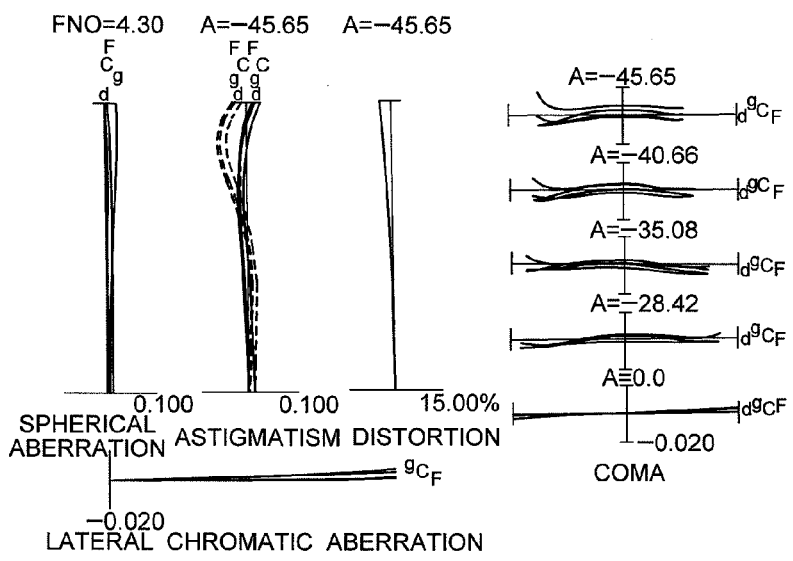
Figure 8C:
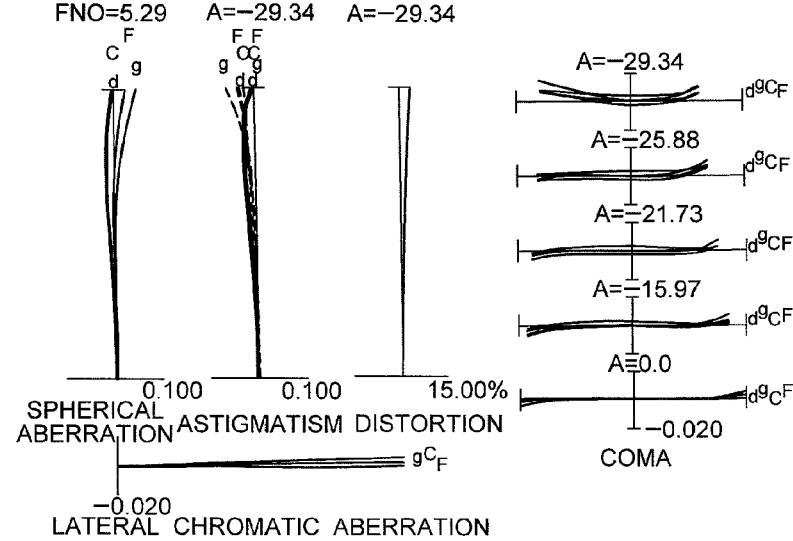

FIGS. 8A, 8B and 8C are graphs showing various aberrations of the zoom lens according to Example 4 of the present application upon focusing on an infinitely distant object, in which FIG. 8A shows various aberrations in a wide-angle end state, FIG. 8B shows various aberrations in an intermediate focal length state, and FIG. 8C shows various aberrations in a telephoto end state.

As is apparent from the respective graphs, the zoom lens according to Example 4 shows superb optical performance as a result of good corrections to various aberrations in each focal length state from the wide-angle end state through the telephoto end state.

Each Example described above makes it possible to realize a zoom lens having a reflection optical element and a wide angle of view with thinning its profile by means of shortening the object side lens length from the reflection optical element, in other words, a distance along an optical axis between the most object side lens surface and an object side optical surface of the reflection optical element. Each Example only shows a specific example for the purpose of better understanding of the present application. Accordingly, it is needless to say that the application in its broader aspect is not limited to the specific details and representative devices.

Incidentally, the following description may suitably be applied within limits that do not deteriorate optical performance.

In the above described Examples, although a zoom lens having a three-lens-group configuration or a four-lens-group configuration has been shown, the above described lens configuration can be applied to other lens configurations such as a five-lens-group configuration and a six-lens-group configuration. Specifically, a lens configuration in which a lens or a lens group is added to the most object side, or the most image side may be possible. Incidentally, a lens group is defined as a portion having at least one lens that is separated from the other portions by air spaces.

In a zoom lens according to the present application, in order to vary focusing from an infinitely distant object to a close object, a portion of a lens group, a single lens group or a plurality of lens groups may be moved as a focusing lens group along the optical axis. It is particularly preferable that at least a portion of the third lens group is used as the focusing lens group. In this case, the focusing lens group can be used for auto focus, and suitable for being driven by a motor such as an ultrasonic motor.

In a zoom lens according to the present application, a lens group or a portion of a lens group may be moved in a direction having a component perpendicular to the optical axis, or swayed in a direction including the optical axis for making it as a vibration reduction lens group that corrects an image blur caused by a camera shake. It is particularly preferable in a zoom lens according to the present application that at lest a portion of the second lens group is made to be the vibration reduction lens group.

Moreover, any lens surface in a zoom lens according to the present application may be formed as a spherical surface, a plane surface or an aspherical surface. When a lens surface is a spherical surface or a plane surface, processing and assembling become easy, so that deterioration of optical performance caused by errors upon processing and assembling can be prevented. Even if the image plane is shifted, deterioration in optical performance is small, so that it is desirable.

When the lens surface is an aspherical surface, the aspherical surface may be fabricated by a fine grinding process, a glass molding process that a glass material is formed into an aspherical shape by a mold, or a compound type process that a resin material is formed into an aspherical shape on a glass surface. Any lens surface may be a diffractive optical surface. Any lens may be a graded index lens (GRIN lens), or a plastic lens.

In a zoom lens according to the present application, although an aperture stop S is preferably disposed in the vicinity of the second lens group, the function may be substituted by a lens frame without disposing a member as an aperture stop.

An antireflection coating having high transmittance over a broad wavelength range may be applied to each lens surface in a zoom lens according to the present application to reduce flare or ghost images, so that high optical performance with a high contrast can be achieved.

Then, a camera according to the present application is explained with reference to FIGS. 9 and 10.

Figure 9A:
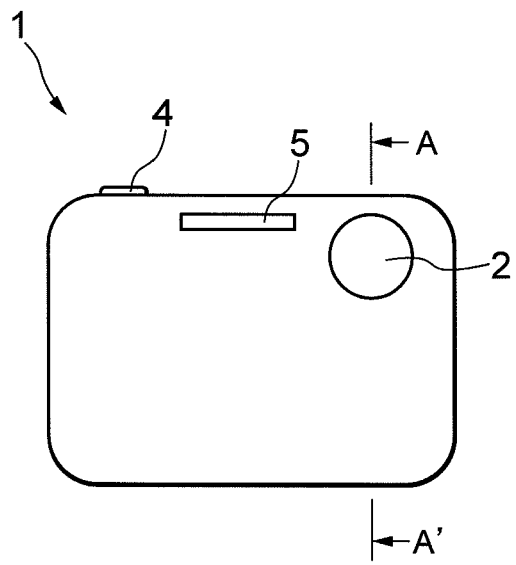
Figure 9B:
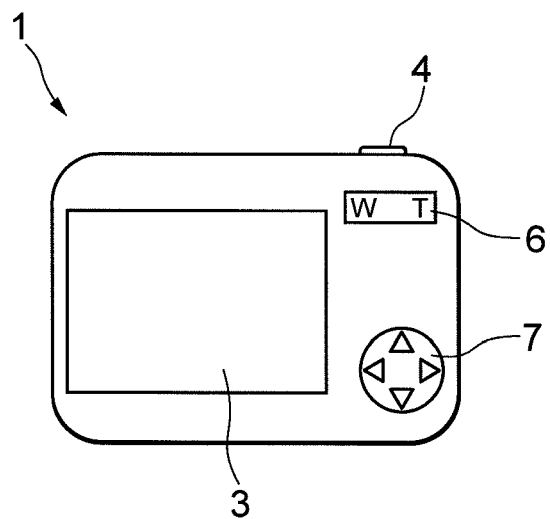

FIGS. 9A and 9B are graphs showing a camera equipped with a zoom lens according to the present application, in which FIG. 9A is a front view, and FIG. 9B is a rear view. FIG. 10 is a sectional view along A-A' line in FIG. 9A.

Figure 10:
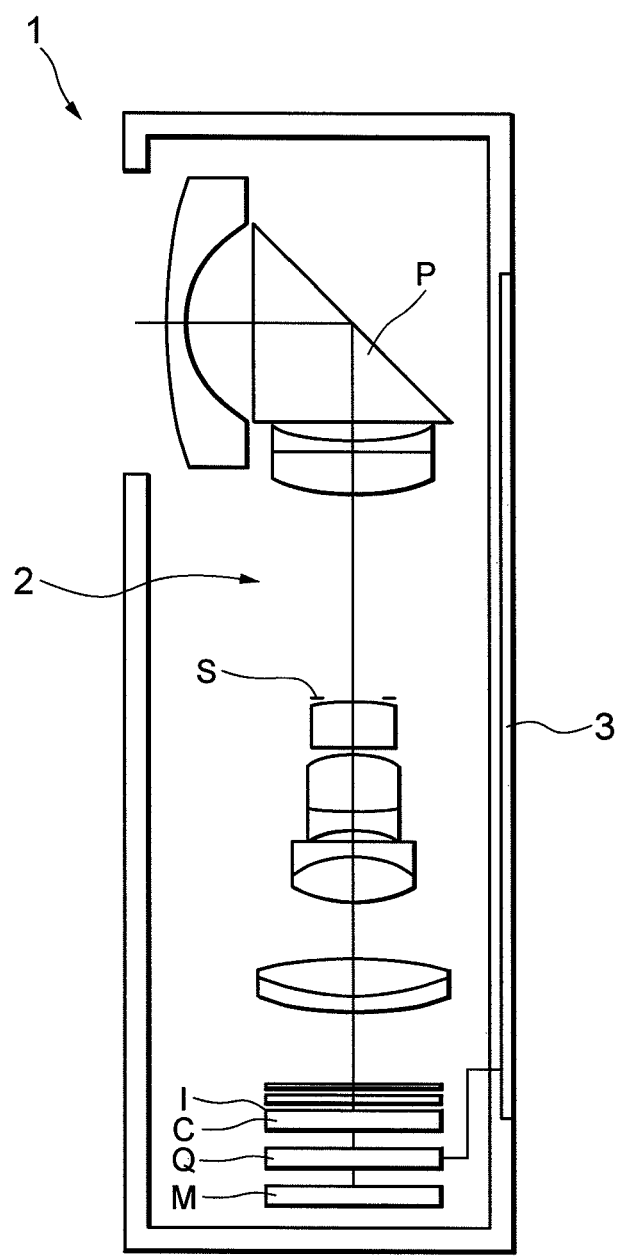
FIG. 10 is a sectional view along A-A' line in FIG. 9A.

As shown in FIG. 10, the camera 1 is an electronic still camera equipped with the zoom lens according to Example 1 as an image-taking lens 2.

In the camera 1, when an unillustrated power switch button is pressed by a photographer, an unillustrated shutter that covers the image-taking lens 2 is opened. Accordingly, light rays from an unillustrated object (object to be photographed) are incident on the image-taking lens 2, deflected by a reflection optical element (right angle prism) P downward by the amount of 90 degrees as shown in FIG. 10, and forms an image of the object on an imaging surface of an imaging device C. The object image is captured by the imaging device C. Accordingly, an image signal output from the imaging device C is converted by a signal processor Q into a distortion-corrected image signal. Then, the image is displayed on a liquid crystal monitor 3 disposed on the backside of the camera 1. After fixing the image composition of the object image with observing the liquid crystal monitor 3, the photographer depresses a release button 4 to take a picture of the object image by the imaging device C. Accordingly, the image signal output from the imaging device C is transformed by the signal processor Q into a distortion-corrected image signal, and stored in a memory M. In this manner, the photographer can take a picture of the object by the camera 1.

Here, an example of a method for correcting distortion by the signal processor Q is explained.

At first, the signal processor Q determines the image height Yw on the imaging device C in the wide-angle end state on the basis of the following expression (7). Then, the signal processor Q transforms an image signal obtained by the imaging device C in the wide-angle end state such that the image signal formed on the range of the image height Yw in the wide-angle end state is transformed into the image signal formed on the range of the image height Yt, thereby correcting distortion. Accordingly, the camera 1 makes it possible to obtain an image whose distortion is corrected:

$$Yw = Yt \cdot ((100 + \text{Dist})/100) + \alpha \quad (7)$$

where Yw denotes an image height on the imaging device in the wide-angle end state, Yt denotes an image height on the imaging device in the telephoto end state, Dist denotes an amount of distortion (%) in the wide-angle end state, and α denotes a surplus amount on the imaging area of the imaging device.

In the camera 1, the following members are provided such as an auxiliary light emitter 5 that emits auxiliary light when the object is dark, a W-T switch 6 that makes the zoom lens system carry out zooming between a wide-angle end state (W) and a telephoto end state (T), and a function button 7 that is used for setting various conditions of the camera 1.

Here, the zoom lens according to Example 1 installed in the camera 1 as an image-taking lens 2 is a zoom lens having a reflection optical element and a wide angle of view with thinning its profile by means of shortening the object side lens length from the reflection optical element, in other words, a distance along an optical axis between the most object side lens surface and an object side optical surface of the reflection optical element. Accordingly, the camera 1 makes it possible to realize a downsized, thin camera body and have a wide angle of view and excellent optical performance. Incidentally, the same effect as the above-described camera 1 can be obtained upon constructing a camera equipped with any one of zoom lens according to Examples 2 through 4 as an image-taking lens 2.

Then, an outline of a method for manufacturing a zoom lens according to the present application is explained with reference to FIG. 11.

Figure 11:
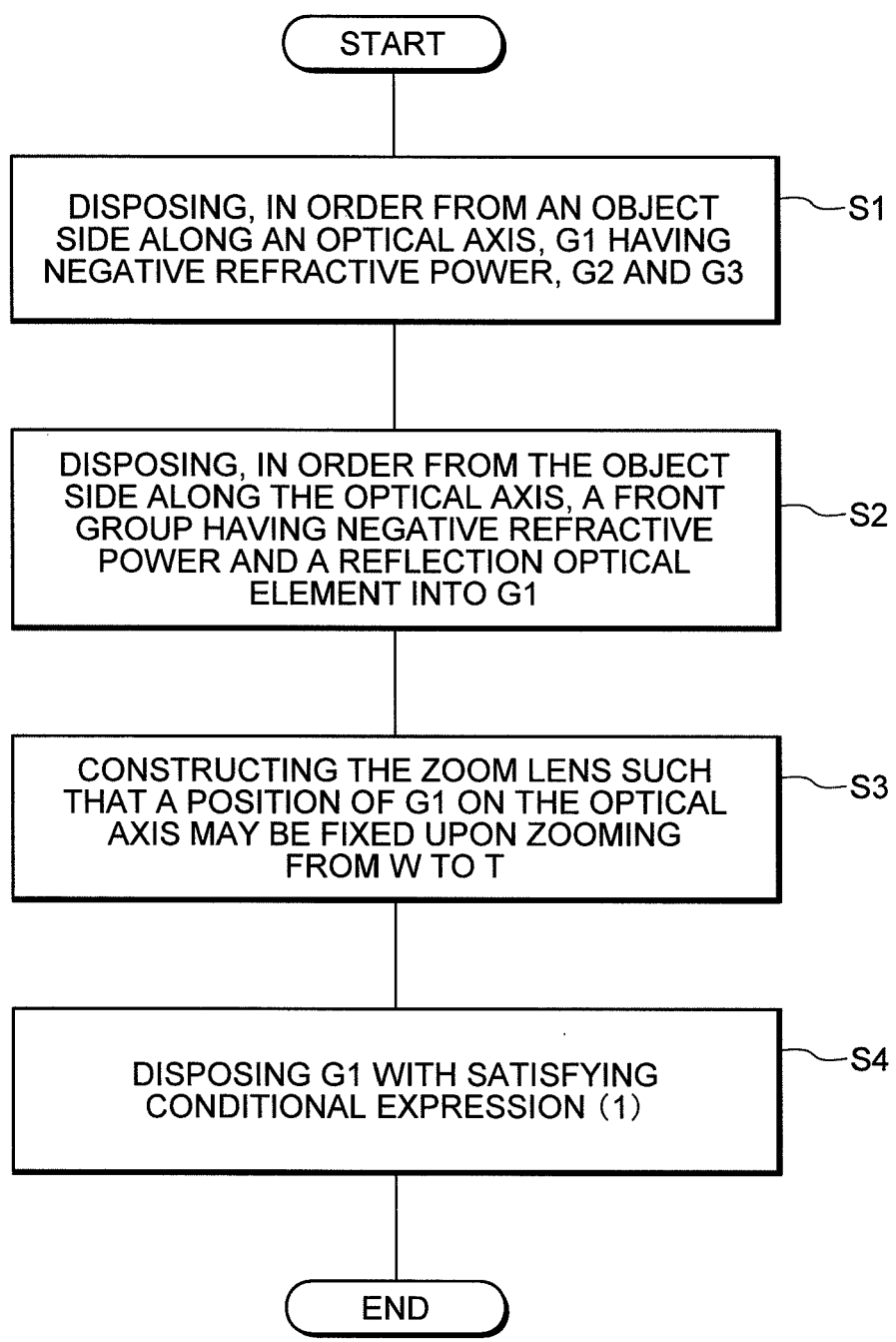
FIG. 11 is a flowchart schematically explaining a method for manufacturing a zoom lens according to the present application.

FIG. 11 shows a method for manufacturing the zoom lens according to the present application.

The method for manufacturing a zoom lens according to the present application includes the following steps S1 through S4.

Step S1: Disposing, in order from an object side along an optical axis, a first lens group having negative refractive power, a second lens group, and a third lens group.

Step S2: Disposing, in order from the object side along the optical axis, a front group having negative refractive power and a reflection optical element into the first lens group.

Step S3: Constructing the zoom lens such that a position of the first lens group on the optical axis may be fixed upon zooming from a wide-angle end state to a telephoto end state.

Step S4: Disposing the first lens group with satisfying the following conditional expression (1):

$$(-f1p)/Dp < 0.89 \quad (1)$$

where f1p denotes a focal length of the front group, and Dp denotes an optical path length of the reflection optical element.

With the method for manufacturing a zoom lens according to the present application, it becomes possible to manufacture a downsized zoom lens having a reflection optical element and a wide angle of view with thinning its profile by means of shortening the object side lens length from the reflection optical element, in other words, a distance along an optical axis between the most object side lens surface and an object side optical surface of the reflection optical element.

What is claimed is:

1. A zoom lens comprising, in order from an object side along an optical axis:
   a first lens group having negative refractive power;
   a second lens group; and
   a third lens group,
   the first lens group including, in order from the object side along the optical axis, a front group having negative refractive power, and a reflection optical element that folds an optical path,
   a position of the first lens group being fixed along the optical axis upon zooming from a wide-angle end state to a telephoto end state, and
   the following conditional expression being satisfied:

$$(-f1p)/Dp < 0.89$$

where f1p denotes a focal length of the front group, and Dp denotes a length of the reflection optical element along the optical axis.

2. The zoom lens according to claim 1, wherein the following conditional expression is satisfied:

$$0.70 < D1p/fw < 2.00$$

where D1p denotes a distance along the optical axis between the object side lens surface of the most object side lens and the object side surface of the reflection optical element, and fw denotes a focal length of the zoom lens in the wide-angle end state.

3. The zoom lens according to claim 1, wherein the following conditional expression is satisfied:

$$2.16 < Dp/fw$$

where Dp denotes the length of the reflection optical element along the optical axis, and fw denotes a focal length of the zoom lens in the wide-angle end state.

4. The zoom lens according to claim 1, wherein the second lens group and the third lens group have positive refractive power.

5. The zoom lens according to claim 1, wherein the following conditional expression is satisfied:

$$0.36 < (-f1)/f2 < 1.00$$

where f1 denotes a focal length of the first lens group, and f2 denotes a focal length of the second lens group.

6. The zoom lens according to claim 1, wherein the following conditional expression is satisfied:

$$0.29 < (-f1 \cdot fw)/ft^2 < 0.54$$

where f1 denotes a focal length of the first lens group, fw denotes a focal length of the zoom lens in the wide-angle end state, and ft denotes a focal length of the zoom lens in the telephoto end state.

7. The zoom lens according to claim 1, wherein the following conditional expression is satisfied:

$$1.62 < (-f1)/fw < 2.99$$

where f1 denotes a focal length of the first lens group, and fw denotes a focal length of a zoom lens in the wide-angle end state.

8. The zoom lens according to claim 1, wherein upon zooming from the wide-angle end state to the telephoto end state the second lens group is moved along the optical axis only to the object side, and the third lens group is moved along the optical axis.

9. The zoom lens according to claim 1, wherein the first lens group consists of, in order from the object side along the optical axis, the front group, the reflection optical element, a negative lens, and a positive lens.

10. The zoom lens according to claim 9, wherein the negative lens is cemented with the positive lens.

11. The zoom lens according to claim 1, wherein at least one lens surface in the first lens group is an aspherical surface.

12. The zoom lens according to claim 1, wherein the reflection optical element folds the optical path by an amount of 90 degrees.

13. An optical apparatus equipped with the zoom lens according to claim 1.

14. The optical apparatus according to claim 13, wherein the optical apparatus includes an imaging portion that takes an image formed by light rays transmitted through the zoom lens and generates an image signal, and a signal processor that transforms the image signal into a distortion-corrected image signal.

15. A method for manufacturing a zoom lens comprising steps of:
    disposing, in order from an object side along an optical axis, a first lens group having negative refractive power, a second lens group, and a third lens group;
    the first lens group including, in order from the object side along the optical axis, a front group having negative refractive power, and a reflection optical element that folds an optical path; and
    constructing the zoom lens such that a position of the first lens group on the optical axis is fixed upon zooming from a wide-angle end state to a telephoto end state;
    the first lens group being disposed with satisfying the following conditional expression:

$$(-f1p)/Dp < 0.89$$

where f1p denotes a focal length of the front group, and Dp denotes a length of the reflection optical element along the optical axis.

* * * * *